(12) United States Patent
Sanz-Pastor et al.

(10) Patent No.: US 8,280,405 B2
(45) Date of Patent: Oct. 2, 2012

(54) LOCATION BASED WIRELESS COLLABORATIVE ENVIRONMENT WITH A VISUAL USER INTERFACE

(75) Inventors: Ignacio Sanz-Pastor, San Francisco, CA (US); David L. Morgan, III, Leawood, KS (US); Javier Castellar, Truckee, CA (US)

(73) Assignee: Aechelon Technology, Inc., San Francisco, CA (US)

( * ) Notice: Subject to any disclaimer, the term of this patent is extended or adjusted under 35 U.S.C. 154(b) by 1122 days.

(21) Appl. No.: 11/618,672

(22) Filed: Dec. 29, 2006

(65) Prior Publication Data

US 2007/0242131 A1 Oct. 18, 2007

Related U.S. Application Data

(60) Provisional application No. 60/755,739, filed on Dec. 29, 2005.

(51) Int. Cl.
*H04W 24/00* (2009.01)
*H04W 4/02* (2009.01)
*H04L 12/58* (2006.01)
*H04B 1/38* (2006.01)
*G09G 5/12* (2006.01)

(52) U.S. Cl. ............... 455/456.2; 345/632; 345/636; 345/633; 345/634; 345/637; 455/412.1; 455/414.1; 455/420; 455/566

(58) Field of Classification Search .......... 455/456, 455/414.1, 420, 456.1–457, 466, 566; 345/629–641
See application file for complete search history.

(56) References Cited

U.S. PATENT DOCUMENTS

| | | | | |
|---|---|---|---|---|
| 5,884,216 A * | 3/1999 | Shah et al. | ..................... | 701/207 |
| 6,222,583 B1 * | 4/2001 | Matsumura et al. | .......... | 348/113 |
| 6,507,802 B1 * | 1/2003 | Payton et al. | ................. | 702/150 |
| 6,822,624 B2 * | 11/2004 | Naimer et al. | .................... | 345/9 |
| 6,909,708 B1 * | 6/2005 | Krishnaswamy et al. | ..... | 370/352 |
| 6,930,715 B1 * | 8/2005 | Mower | ......................... | 348/239 |
| 7,031,875 B2 * | 4/2006 | Ellenby et al. | ................ | 702/150 |
| 7,057,614 B2 * | 6/2006 | Akatsuka et al. | ............. | 345/427 |
| 7,088,389 B2 * | 8/2006 | Shibasaki et al. | ............. | 348/239 |
| 7,091,852 B2 * | 8/2006 | Mason et al. | ............ | 340/539.13 |
| 7,170,632 B1 * | 1/2007 | Kinjo | ............................. | 358/1.9 |
| 7,720,436 B2 * | 5/2010 | Hamynen et al. | ............. | 455/13.1 |

(Continued)

OTHER PUBLICATIONS

PCT International Search Report and Written Opinion, PCT/US06/62767, Feb. 13, 2008, 8 pages.

*Primary Examiner* — Matthew Sams
(74) *Attorney, Agent, or Firm* — Fenwick & West LLP

(57) ABSTRACT

A wireless networked device incorporating a display, a video camera and a geo-location system receives geo-located data messages from a server system. Messages can be viewed by panning the device, revealing the message's real world location as icons and text overlaid on top of the camera input on the display. The user can reply to the message from her location, add data to an existing message at its original location, send new messages to other users of the system or place a message at a location for other users. World Wide Web geo-located data can be explored using the system's user interface as a browser. The server system uses the physical location of the receiving device to limit messages and data sent to each device according to range and filtering criteria, and can determine line of sight between the device and each actual message to simulate occlusion effects.

28 Claims, 8 Drawing Sheets

U.S. PATENT DOCUMENTS

| | | | |
|---|---|---|---|
| 7,844,229 B2 * | 11/2010 | Gyorfi et al. | 455/70 |
| 7,917,153 B2 * | 3/2011 | Orwant et al. | 455/456.1 |
| 7,925,243 B2 * | 4/2011 | McGary | 455/414.1 |
| 2002/0062246 A1 * | 5/2002 | Matsubara | 705/14 |
| 2002/0065090 A1 * | 5/2002 | Ohba | 455/503 |
| 2002/0086672 A1 * | 7/2002 | McDowell et al. | 455/432 |
| 2002/0140745 A1 * | 10/2002 | Ellenby et al. | 345/848 |
| 2002/0167536 A1 * | 11/2002 | Valdes et al. | 345/633 |
| 2003/0027553 A1 * | 2/2003 | Davidson et al. | 455/412 |
| 2003/0104820 A1 * | 6/2003 | Greene et al. | 455/456 |
| 2003/0218638 A1 * | 11/2003 | Goose et al. | 345/850 |
| 2005/0032527 A1 * | 2/2005 | Sheha et al. | 455/456.1 |
| 2006/0190812 A1 * | 8/2006 | Ellenby et al. | 715/512 |
| 2007/0123280 A1 * | 5/2007 | McGary et al. | 455/466 |
| 2007/0162942 A1 * | 7/2007 | Hamynen et al. | 725/105 |
| 2007/0237318 A1 * | 10/2007 | McGary | 379/114.15 |
| 2007/0271035 A1 * | 11/2007 | Stoschek et al. | 701/209 |
| 2008/0122871 A1 * | 5/2008 | Guday | 345/634 |
| 2008/0243861 A1 * | 10/2008 | Wassingbo et al. | 707/10 |
| 2009/0049004 A1 * | 2/2009 | Nurminen et al. | 707/1 |
| 2010/0194782 A1 * | 8/2010 | Gyorfi et al. | 345/633 |

* cited by examiner

LOCATION BASED WIRELESS COLLABORATIVE ENVIRONMENT WITH A VISUAL USER INTERFACE

CROSS-REFERENCE TO RELATED APPLICATIONS

This application claims the benefit of U.S. Provisional Application Ser. No. 60/755,739 filed on Dec. 29, 2005, which is incorporated by reference herein in its entirety.

BACKGROUND OF THE INVENTION

1. Field of the Invention

The present invention relates generally to the field of computer graphics and networked wireless communication.

2. Description of the Related Art

The World-Wide-Web, e-mail and instant messaging have revolutionized team collaboration, together with applications such as Lotus Notes and Microsoft Groove. The availability of mobile computing devices, together with access to the Global Positioning System (GPS) network are starting to bring the tools available for fixed location team collaboration to any place at any time. Devices such as the RIM Blackberry and the Palm Treo have brought e-mail to mobile devices with great success, but their effectiveness is certainly limited compared to the environment available to systems designed for use in fixed locations, in many cases due to interface and usability problems. Tools that work exceptionally well in an office environment prove themselves grossly inadequate for the same tasks when they need to be performed in the field and, in many cases, under pressure and adverse circumstances, as is often the case for rescue teams, military operations, law enforcement, infrastructure repair crews, and other teams that need to get a job done quickly and with efficient coordination. Currently, those teams typically rely on radio or cellular network communications without the capability of storing information to be shared; or they use text-based messaging/electronic mail systems that are hard to integrate with what is happening on the field and where it is taking place.

In addition, browsing the World Wide Web on mobile devices is a much less rewarding experience than doing so on larger computers. Small screens, cumbersome interfaces and slow update speeds limit the usability of mobile devices.

Recent trends in Internet content generation have seen the appearance of geotags—XML fields added to a web page that provide exact latitude and longitude coordinates. All of this is fostering developments in Internet mapping and cartography, from the original Internet maps to advanced applications such as Google Maps, Google Earth and Microsoft's TerraServer. These applications use traditional maps and computer graphics renderings of real world satellite imagery to allow users to view and navigate locations, access content and interact with the information available on the web with geographic locality. The appearance of geolocation tags on web content are enabling applications to be used not just for mapping but to display Internet search results for localized areas—services such as Yahoo! and Google Local allow the user to search for restaurants close to a given location, and display the returned results on a map.

Maps are ideal for fixed-location computing with large displays, but the small screen sizes and interfacing constraints of mobile devices can limit their usability in mobile applications. In addition, a map has to be interpreted by the user and reconciled with her actual position in the real world, sometimes requiring significant effort to understand fully the information represented on the map.

Military aircraft have long incorporated a different type of display, the Heads Up Display (HUD), where a representation of the aircraft instruments is displayed on a see-through mirror and superimposed over the out-the-window scene the pilot sees through the aircraft's canopy. HUD systems have repeatedly proven to increase pilot effectiveness and response time. Recently, HUD systems have appeared on civil aircraft and even in automobiles.

Augmented reality is a branch of computer graphics that focuses on the incorporation of interactively-rendered imagery into real-world scenes. In most cases, it is implemented by using see-through head-mounted displays (HMDs) where the user can see both the real world surrounding her and a perspective-matched computer graphics rendering of objects in the scene. The field was pioneered by Ivan Sutherland, who introduced the first see-through HMD in 1968.

Augmented reality has been used for applications such as aircraft maintenance training and navigation in complex environments such as a factory floor, where the user can see information displayed over the real scene, annotating the real world. Some recent projects such as "A Touring Machine" developed at Columbia University in 1997 allow annotation of real world locations and interaction with geographically tagged database content on a transportable computing device.

While some existing wireless data communications tools such as text messaging, e-mail and instant messaging can be useful, making use of those while deployed in the field is cumbersome and inefficient. A limitation of these systems is that even though the information shared might have relevance to a specific physical location, these systems do not adapt the presentation of the information according to the perspective from one's location. Representing geographically tagged data on a map can improve the efficiency and has been used by certain DARPA military unit test wireless communication systems, but this forces the team members to constantly re-interpret the map and its correspondence to the real world scenario around them as they move, something made harder by the small screen real estate available on mobile devices.

SUMMARY OF THE INVENTION

The present invention provides a system having advantages associated with a heads-up display as well as augmented reality technology allowing interaction within a collaborative environment similar to e-mail or instant messaging but with geographic locality, enabling teams to share information while on location with the same flexibility and immediacy that e-mail and instant messaging have brought to fixed location, office-based teams.

A system in accordance with the present invention includes a server in communication with one or more client devices over a network such as a cellular telephone network. A client device includes a video capture device such as a video camera, which displays a live captured image on a screen of the client device. Data received from the server or other devices is overlaid on the live image in real time. In this way, the client device functions as a window between the real world and the virtual world of a networked collaborative environment by fusing data from the virtual world with live video from the device's camera. Users of this system can gaze through this window by pointing their device at areas of interest in their real environment and viewing the scene on the device's screen as with a common video camera's viewfinder, but with messages and data from the virtual world overlaid on the real scene. The user can interact with others in the collaborative environment by accessing and creating messages and data presented via the client device window.

The present invention simplifies team collaboration on mobile devices, by allowing users to access and create geographically tagged information. A system in one embodiment uses a wireless computing device as its delivery platform, connected to a server system and/or other wireless devices over a network. The wireless device is also equipped with a high resolution display capable of rendering real time graphics, a video camera, a geo-location device that provides its current position (such as a GPS receiver or a radiolocation device using triangulation of cell phone network base station signals), and a view tracking system (such as an inertial tracker or a software based image tracker) that determines the orientation of its camera in real time. In one embodiment, the present invention includes a networked client device and a server side application; alternatively the functionality provided by the server can be carried out by client devices in the case of a peer-to-peer network.

DETAILED DESCRIPTION OF THE PREFERRED EMBODIMENTS

Figure 1:
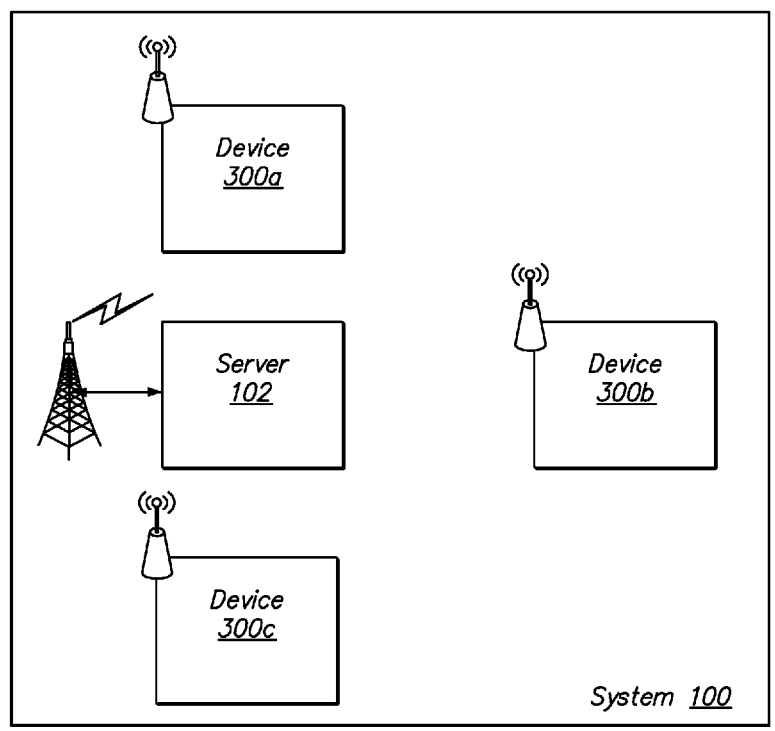
FIG. 1 illustrates wireless clients in communication with a server in accordance with an embodiment of the present invention.

FIG. 1 illustrates a system 100 for providing wireless collaboration in accordance with an embodiment of the present invention. System 100 includes a server 102 and wireless client devices 300a, 300b, 300c. As illustrated, server 102 is in contact with client devices 300a, 300b and 300c via a wireless interface, for example a cellular network. Multiple client devices 300a, 300b, and 300c are illustrated to indicate that server 102 may be in contact with a plurality of client devices. For clarity of description, we refer generally to client device 300, though any number of client devices may be in operation and communication with server 102. The operation of and interaction between server 102 and client device 300 is described further below.

Figure 3:
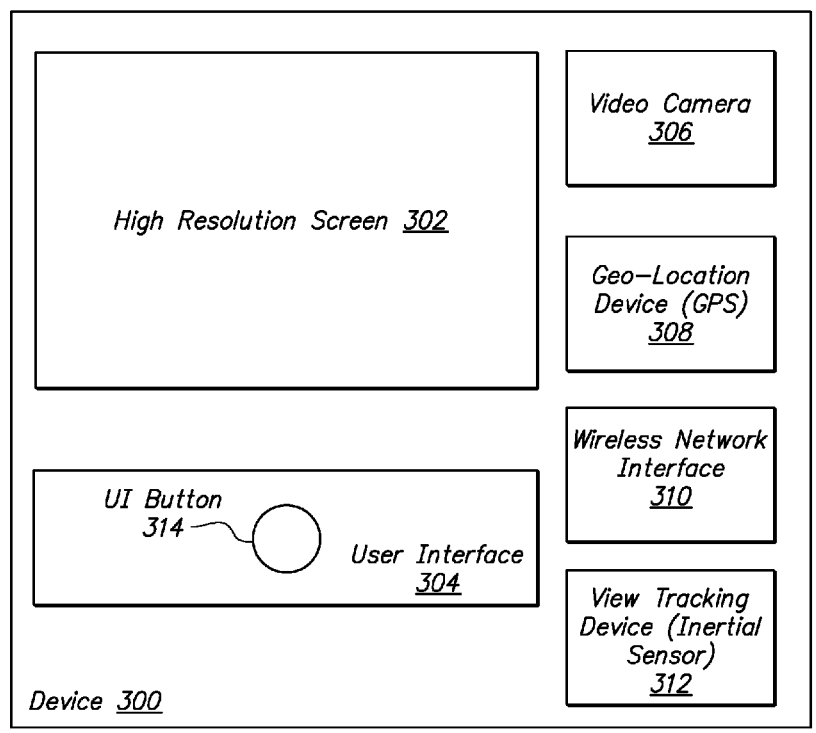
FIG. 3 illustrates a wireless client device in accordance with an embodiment of the present invention.

In one embodiment, geographically tagged messages are received and sent by client device 300 via its wireless network interface 310 (FIG. 3). Messages in one embodiment include latitude, longitude and elevation coordinates, and in one embodiment Extensible Markup Language (XML) standard geo-locations tags are used.

Client device 300 presents those messages to a user on screen 302 as a graphics overlay on top of input from video camera 306. As the user pans the device around her environment, she can see basic information about each message at its actual physical location on screen 302, combined with the real world image captured by the camera 306. Such information can include, for example, a user-selected icon, message subject, coordinates, range and time information for each message. Messages in one embodiment are color- and size-coded and filtered according to distance, time, priority level, category, sender and other user-set criteria to facilitate navigation. Device 300 can also determine occlusion information for each message, and not present occluded messages or present them in an attenuated fashion by making them transparent when drawn or using a different color coding.

At any time, a user can expand a particular message and see its contents in more detail overlaid in front of the scene, for example by centering the desired message icon on the screen 302 by pointing the camera 306 at it, and pushing a button 314 while the message is contained inside a selection target box located at the center of the screen 302. Other UI implementations for selecting and displaying a message can be used, as will be apparent to those of skill in the art. Similar to e-mail messages, the geographically tagged messages can contain, for example, text, audio, video, pictures or a hyperlinked URL to additional content, in addition to their coordinates and time and date information.

After receiving a message, the user can add information to the message at a specific location for other users to see, edit its content, reply to the user who sent the message from her current location, send a new message to a given user, or post a message for a given group of target users at a specific location to see. In addition, if she desires, her current location can be sent as a continuously updated message, so other users can find her location by just panning around their devices from their current position—or she can find the location of any other members who are currently broadcasting their position by panning around her camera and seeing their icons over the real-world camera image.

To facilitate input on the go, in one embodiment data in addition to text is supported. For example, a voice message can be recorded as audio; preset simple messages that cover commonly conveyed information, or a predetermined icon with a given contextual meaning can also be attached to a message without requiring keyboard input. Once read, the message can be closed to return to the camera input message interface, and deleted if desired.

Client wireless device 300 captures input from video camera 306 in real time and paints it as a background on screen 302. Client device 300 also determines its current location using geo-location device 308, and its current view direction using view tracking device 312.

As noted, messages (including text or other data items) preferably include geo-location information and may be marked as active or not active. In one embodiment, server 102 determines the active status of each message and communicates the status to device 300. For each received message that is active and meets display criteria selected by the device user, e.g., based on a time the message was sent, the message's recipients, messages of a certain importance, etc., a screen space position is determined from the received coordinates and client device's 300 current location and view direction. Using color in one embodiment to represent range, priority, age or other attributes of the message, if the computed screen space position is contained on screen 302, client device 300 renders the message source, subject, time and date at the proper screen position. As the user pans and moves the camera, the message locations follow their real-world screen projected positions, allowing the user to associate each message with its location by looking around with the device.

In one embodiment, messages are sent to client device 300 either when the user requests an update, at periodic intervals or whenever a certain threshold for positional change is exceeded—for example, whenever device 300 moves more than 20 meters in any direction. In the embodiment illustrated in FIG. 1, messages are received from server 102; in a peer-to-peer environment, server 102 is not present, and messages are received from other client devices. A peer-to-peer embodiment is described further below.

Figure 2:
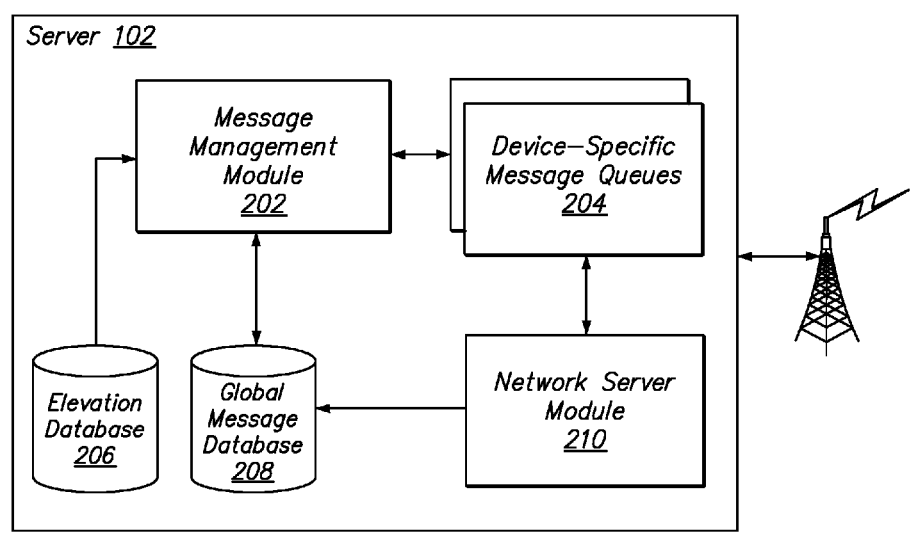
FIG. 2 is a block diagram of a message server in accordance with an embodiment of the present invention.

FIG. 2 illustrates an additional view of server 102. Server 102 maintains a database 208 of all active messages and their coordinates. When client device 300 requests an update and sends its current location to the server 102, server 102 creates an active message list for that device by determining the range of all messages targeted for that client device 300 or any of the user groups it belongs to, and adding the messages that are proximately located, i.e. that are closer than a reception radius threshold, to a range sorted list. The reception radius threshold may be selected by a user of device 300 or by an operator of server 102, or some combination of the two.

In one embodiment, for each message in the range-sorted list, server 102 determines a line-of-sight query from the device's position to the message coordinates, using geometric database 206 of terrain elevation and three-dimensional models of structures and vegetation specific to that location, and then updates an occlusion attribute for the message that are specific to each device's settings.

Once updated, the message is placed into a message queue 204 to be sent to client device 300 via its wireless network interface 310. To economize bandwidth, partial updates are possible where only messages that change are sent, and where indices to currently-stored local messages can be sent to re-order the list according to the current device location and selected filtering criteria.

Client device 300 in one embodiment can participate in a peer-to-peer network without the presence of server 102. In such an embodiment, client devices pass messages to each other until they reach the desired device(s). In such an embodiment, each client (peer) device performs operations that would otherwise be performed by the server, including range-sorting and filtering messages according to its current location. In one embodiment, no occlusion information is generated in the peer-to-peer protocol, if the client devices do not contain a geometric database of the area to query against.

In another embodiment, messages can be sent to the client devices not only from other devices in the collaborative environment, but from any networked computer by adding geographic tag information to the text of any e-mail, instant messenger post or web mail. In this case, server 102 receives the global network traffic and translates the incoming data into the proper messages format. In a similar fashion, client devices can send geo-located messages to any networked computer as e-mail, and server 102 translates those into pop3, IMAP, SMTP or other suitable network data.

User interface 304 of device 300 can also be used to view web content that includes geographical tags, thus providing a browser interface that can simplify interaction with any data that has inherent locality.

System Architecture

FIG. 3 is a diagram of a wireless client device 300 in accordance with an embodiment of the present invention. Device 300 is a computing device with a graphics-capable screen 302 and a user interface 304, and preferably includes at least one button 314, a video camera 306 that can support live video input, and a wireless network interface 310 for supporting a connection such as Wi-Fi, Wi-Max, EDGE or WCDMA. Device 300 also preferably has a geo-location subsystem 308 that provides the latitude, longitude, approximate heading and altitude of the device 300 at regular intervals, in one embodiment at least once per second. In one embodiment this is supplied by a GPS receiver, and alternatively device 300 can also use radiolocation by triangulating cell tower signals. One example of geo-location technology is Rosum Inc.'s TV-GPS triangulation based GPS. Device 300 also includes a view tracking device 312 that determines the spatial orientation—i.e. which direction the camera is looking—of the device in real time. View tracking device 312 in one embodiment includes an inertial three-degree of freedom tracker such as those made by Intersense Inc. of Bedford, Mass.; alternatively a software-based image tracker is used on the captured video; or a magnetic tracker, gyroscope or any other method of determining real world orientation is suitable.

Device 300 may be a tablet PC, laptop, pocket PC, PDA, smart phone digital video camera, digital binoculars, laser range finder, GPS navigation device or other equipment that incorporates the described sub-components and functionality, including a graphics-capable screen and user interface.

Figure 4:
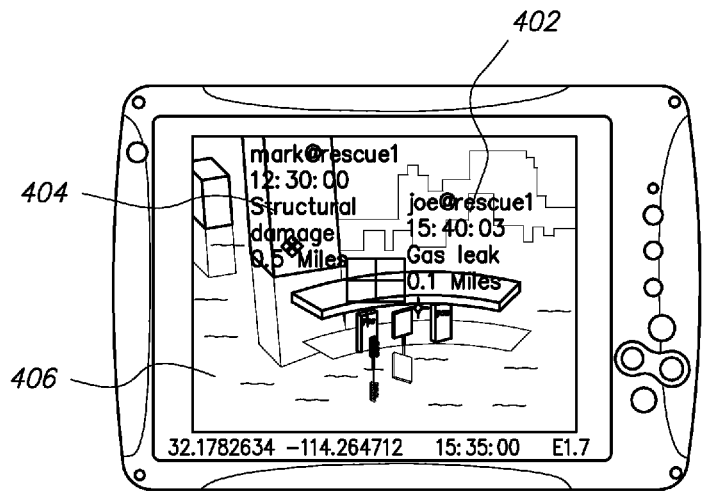
FIG. 4 illustrates an emergency response application in accordance with an embodiment of the present invention.

User interface 304 supports panning the device around in the same way a handheld camera is used. As the user points the camera 306 in different directions, messages are shown overlaid with the camera input on screen 302 at their actual location in the real world. In one embodiment, the message representation includes information on the subject, sender, time and distance. For example, FIG. 4 illustrates an example in which device 300 is used as part of an emergency response operation. A real-time video display 406 shows a flooded area, with two messages 402, 404 overlaid on the image 406. One message 402 indicates that it is from joe@rescue1, sent at 15:40:03, and having text "Gas Leak" at a distance of 0.1 miles; the other message 404 indicates that it is from mark@rescue1, sent at 12:30:00, reads "Structural Damage" and is located at a distance of 0.5 miles".

As the user pans the device 300 around the scene, the message icon moves to reflect its actual real world position in relation to the current location of device 300 as determined from the GPS positioning device 308 and orientation tracking device 312. A user-determined sorting criteria filters out messages to only the relevant subset—including distance, type, priority, sender, recipient list, time and other factors. In FIG. 4, for example, the full message 402 descriptor can be seen now that the user has panned the device, and reads mark@rescue1 12:30:00 Structural Damage 0.5 miles.

Figure 5:
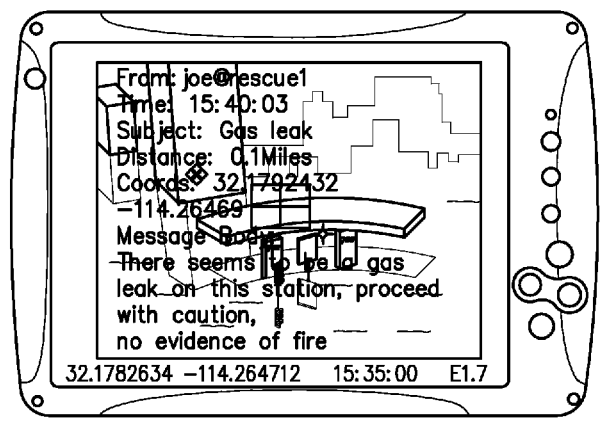
FIG. 5 illustrates a message viewed in an emergency response application in accordance with an embodiment of the present invention.

In one embodiment, by centering a message on the crosshair at the center at the screen and clicking button 314 in the user interface 304, the user can expand it and see the message's full contents overlaid on the camera input. This is illustrated, for example, in FIG. 5. The user can then view any attached files, edit the message, post a reply from her current location, at the message location or at a different place, or remove the message.

Client device 300 sends update requests containing current geo-location and view data to server 102, and server 102 responds with updated range sorted message data according to the client device's current location. Device 300 can also send message updates for server 102 to store in global message database 208 if required, including new messages added by the user on the client device, or existing message updates or replies. Server 102 can also be connected to the Internet for interfacing with other messaging systems and accessing other geo-located web content that can be displayed on the scene as well.

In one embodiment, server 102 and client device 300 use XML-based message data for networked communications, which are transmitted using standard known Internet protocols such as HTTP, SOAP and WSDL. In one embodiment, the delivery system uses an HTTP server such as the Apache HTTP Server.

Figure 6:
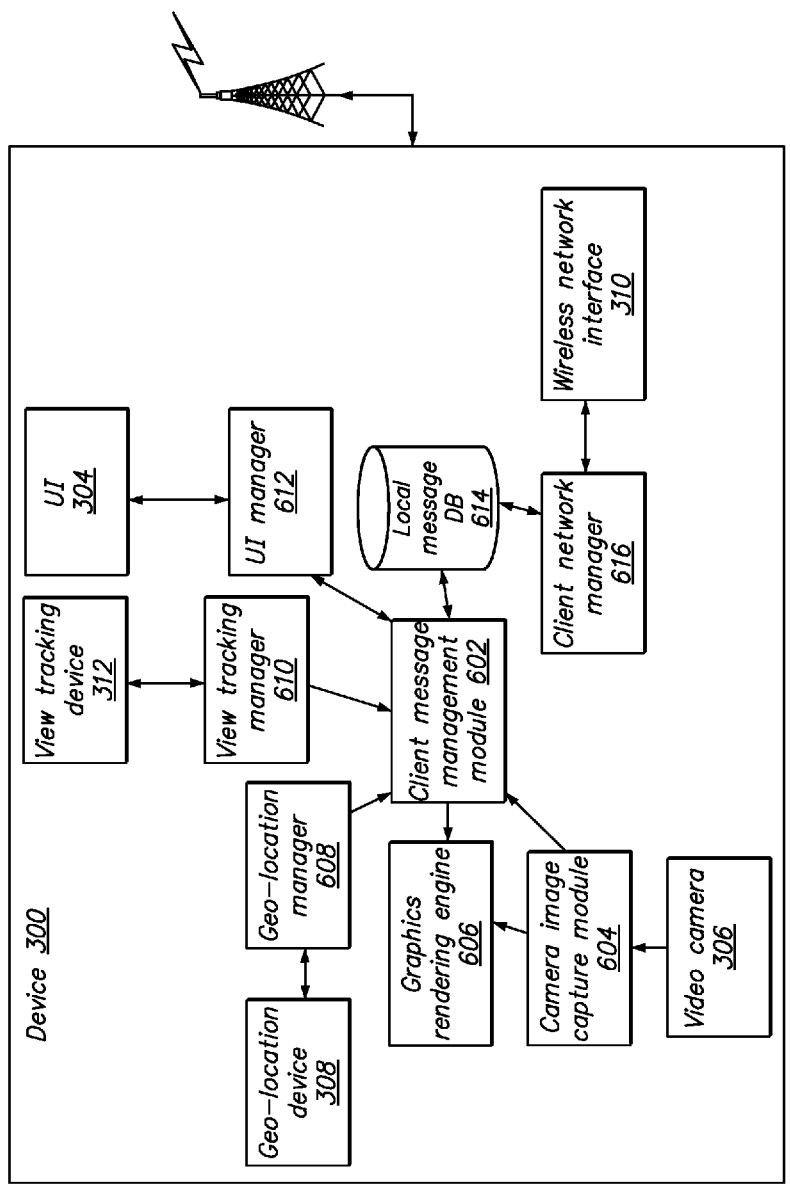
FIG. 6 is a block diagram of a wireless client device in accordance with an embodiment of the present invention.

In one embodiment, client device software components map to the FIG. 3 hardware components as illustrated in FIG. 6. FIG. 6 includes a local message database 614 that caches the messages pertinent to each client, and a central message manager 602 that arbitrates the use of all the other components. A geo-location manager 608 controls interfacing with the geo-location device 308 of FIG. 3, a view tracking manager 610 that interacts with the view tracking device 312, a camera image capture manager 604, a graphics rendering engine 606, a user interface manager 612 and a wireless client network manager 616, all connected to central message manager 602.

Server 102, in addition to global message database 208 that stores messages for all users, has a message queue 204 specific to each client, described further below with respect to FIG. 7, and which is sorted by range from each message's position to the client device's current location, and where each message is particularized for the client, including view occlusion information.

In order to be able to determine view occlusion factors, server 102 includes elevation database 206 for terrain, buildings and other cultural features such as bridges and water towers. Message management module 202 determines a geometric intersection from a device's location to the coordinate of each message, and by comparing the resulting range with the actual distance between the two points, determines whether the message is visible from the device's position. This can be used to occlude or modify the appearance of the message when displayed.

Message management module 202 arbitrates the interaction of all the components of the server message system, including building each device's current target message queue 204, and network server module 210 asynchronously communicates with all the target devices 300 as data becomes available. Network server module 210 provides message data updates to the global message database 208, but uses each device's specific message queue 204 to send data to the client device 300.

The role of server 102 can in alternative embodiments be fulfilled by client devices, building a peer-to-peer network, where clients share all the messages that they have in common, combining their local message databases.

Figure 7:
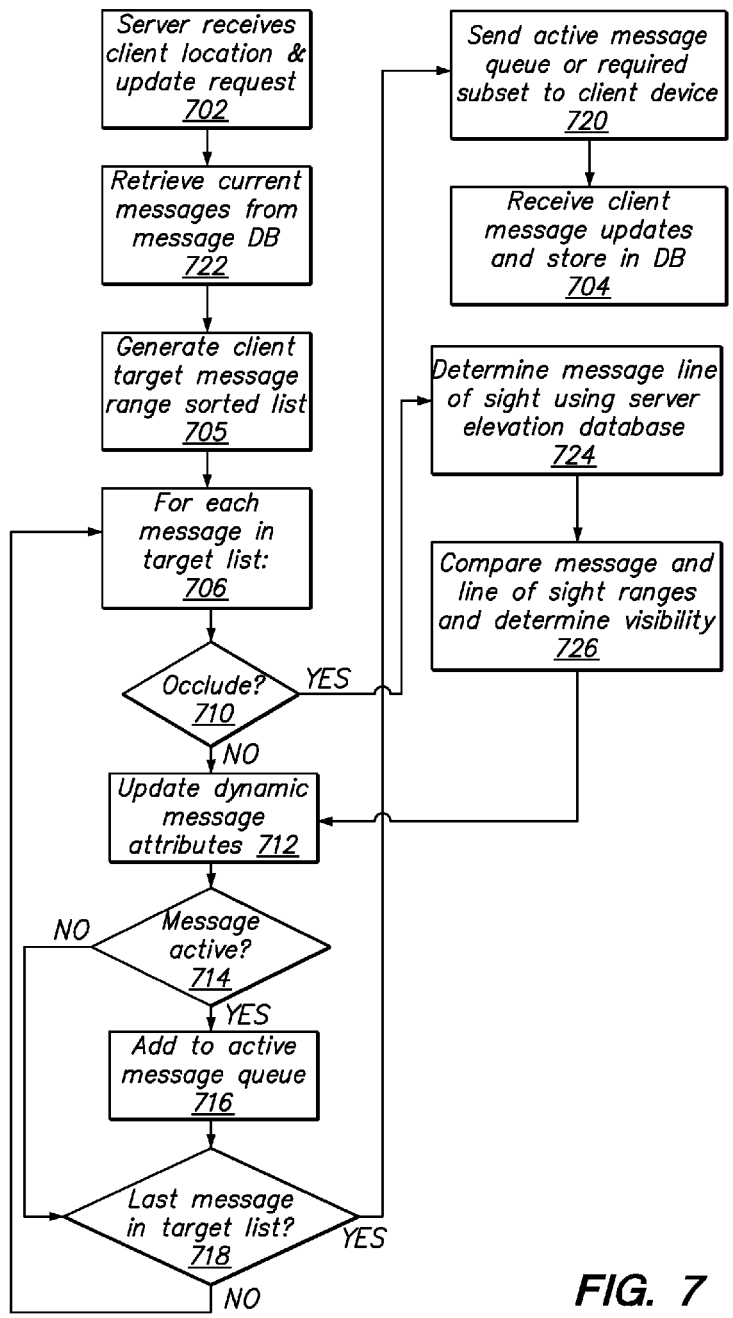
FIG. 7 is a flow chart illustrating a method of operation of a message server in accordance with an embodiment of the present invention.

FIG. 7 illustrates a flow chart for a processing loop executed by server 102 for a given device 300 update. Server 102 initially receives 702 an update request from the client device 300 that includes the device's current geographic location coordinates and view direction information, as well as content filtering settings. Filtering settings supplied by device 300 may include, for example, a maximum range to display, a setting to include only messages posted in the last hour, only marked as urgent or danger alert, and addressed directly to the user or its group.

Server 102 then retrieves 704 all relevant messages from global message database 208, which includes messages for all users of the system, and proceeds to generate 705 a range-sorted target message list for the particular device, in accordance with the device's filtering settings.

For each 706 message in the range-sorted target list, if 710 view occlusion is enabled, a line of sight query against elevation database 206 from the device's position to the message's location is determined 724. If 726 the range computed is less than the distance between both positions, minus a user determined error threshold such as 50 meters in one example, the message is marked as not directly visible from the current location.

The dynamic message attributes (such as range, current relevance ranking or visibility) are then updated 712, and if the message is determined 714 to be active, it is added 716 to an active message queue to be sent to the target device.

Once the entire range sorted list has been processed 718, server 102 sends 720 the active queue to client device 300, and if available, receives 722 any message database updates from client device 300 and stores them in global database 208. In one embodiment, server 102 sends only a partial subset of its contents, in order to economize bandwidth. For example, only the information that has changed since the last update is sent in one embodiment.

Figure 8:
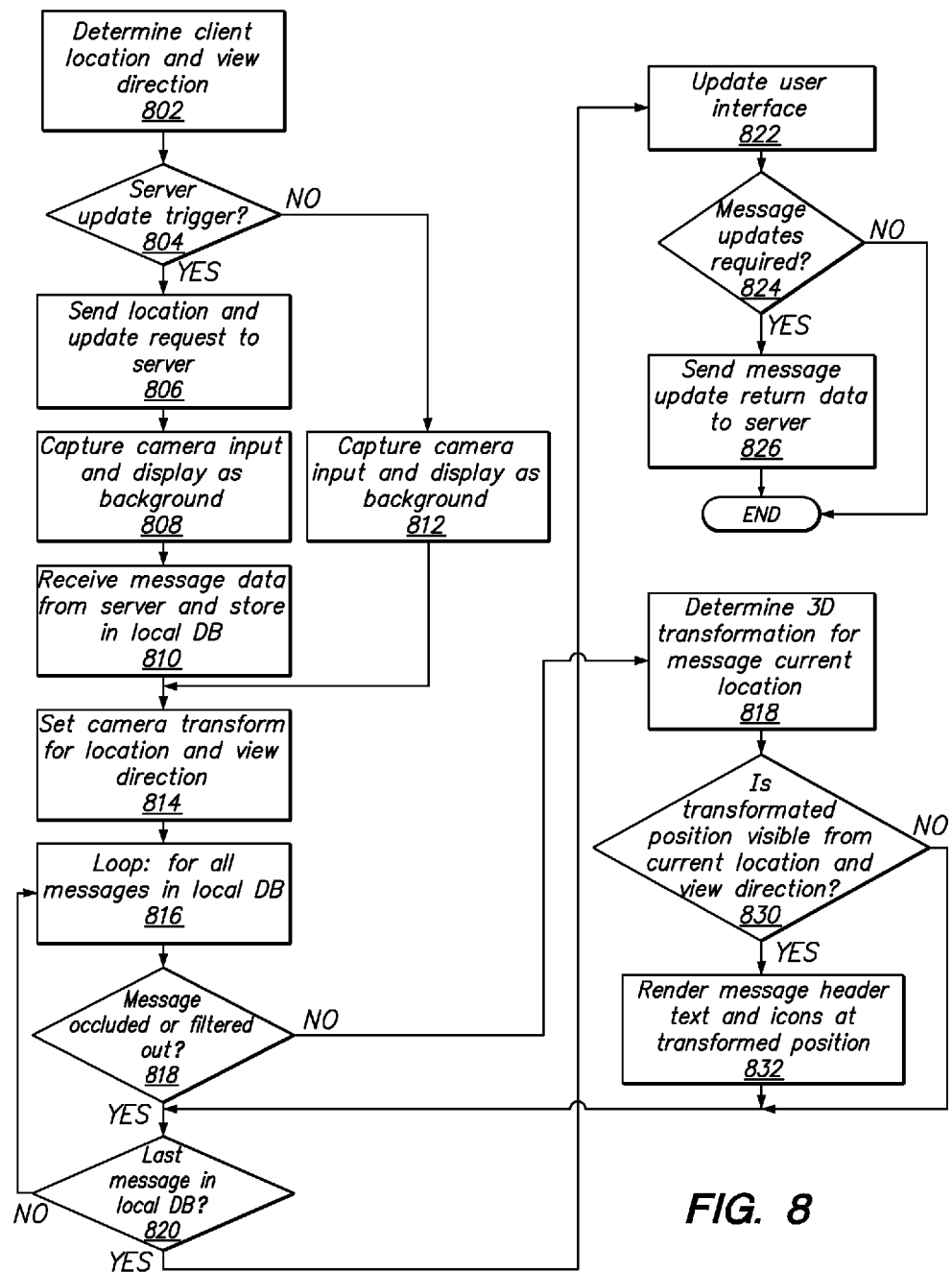
FIG. 8 is a flow chart illustrating a main loop flow for a client device in accordance with an embodiment of the present invention.

FIG. 8 illustrates a main loop flow for a client device 300 in message display mode. First, device 300 determines 802 its current geo-location from geo-location manager 608 and the current view direction from view tracking manager 610. If the location and view direction, or time elapsed since the last update are such that 804 a server update should take place, device 300 sends 806 its location and an update request to server 102. An update is triggered in one embodiment either by a direct request via user interface 304, or by a pre-determined time or distance threshold being exceeded. Regardless of whether server communication is in process, then camera image capture module 604 continuously captures 812 input from video camera 306 and operation proceeds to step 814 described below.

While waiting for a response from server 102, device 300 captures 808 the camera video input from video camera 306 and graphics rendering engine 606 displays it as a background on screen 302 to render over.

Device 300 then receives 810 message data from server 102 via wireless network interface 310, and updates its internal message database 614 with the information. Next, device 300 determines 814 a camera transformation, which may be embodied as an affine matrix well known to those skilled in the art, for the current location and view direction, which will be used to determine whether messages are currently visible on the screen, and the actual screen position of each message at its real world location.

Next, for 816 each active message in the local database 614 that is not 818 fully occluded, i.e. its occlusion flag is not set, or otherwise deactivated (i.e. a previously active message that has been marked inactive by the server), a 3-D transformation for its position from the current device location is determined 828, and its visibility is checked 830 against the current view volume (frustum) defined by the camera transformation.

If the message is determined to be visible on screen 302, it is then rendered 832 as an icon with text including the sender, subject, time and range, at the screen space transformed projected position of the 3D location determined in the previous step.

Once every message has been processed 820, device 300 checks the user interface 304 inputs and updates 822 the on-screen data overlay display, and if 824 message updates have happened or a new message has been generated, it sends 826 an update to server 102 including any changed data. If a user of device 300 has composed a message destined for another device, the message is in one embodiment included in the update request sent to server 102. Following completion of the update, another iteration begins again at step 802.

EMERGENCY RESPONSE EXAMPLE

One application of the present invention is as a tool for collaboration by an emergency response team. For example, the system can be used to facilitate team collaboration on a large scale search and rescue operation such as the one that took place in New Orleans in the wake of Hurricane Katrina or one that would be needed in the event of a large earthquake hitting the San Francisco Bay Area.

A rescue team's effectiveness and safety can be greatly increased by enhancing communication between its members. The ability for a team member to quickly determine the current location of other team members, identify the actual physical location and immediate needs of victims who require help in real time, and be able to share information with other team members about what is happening at a given physical location can be invaluable, particularly when compared to conventional radio communications that require each team member to keep track of all the information as it comes, since there is no storage, or even more rudimentary methods such as the information spray painted on the doors of houses and buildings in New Orleans to identify which locations had been searched.

In the emergency response context, each team member carries a wireless computing device 300 connected in one embodiment to server 102 via a cell data network connection or packet radio, or alternatively connected to a laptop installed on a local vehicle via a local mid range network such as Wi-Max acting as a server—an advantage of the mobile laptop server being its total independence from power and communication infrastructure availability.

Once the team reaches their target area, each member can see on their screen by panning around the device both the position and distance of each member of the team, and if enabled, the physical location of the 911 calls routed to their particular team as they happen in real time, either derived by correlating fixed phone numbers to street addresses, and those to geo-position coordinates, or by direct geo-location of cell phone emergency calls.

A team member in charge of coordinating the effort can see on a global map all the message and team member positions—for example, on the laptop that acts as the local server—and can dispatch instructions to each member of the team to ensure everything is covered with the maximum efficiency and safety possible, which can be displayed as notes on each person's device 300 at a given location, or presented on the screen as an information overlay visible over the camera input.

Team members can place a message at a specific location for a given team member or group, or for everybody to see—for example, information on accessibility from a given direction, places that have already been searched for survivors in need of help, notes on how changes in the environment or the weather may affect their mission, or any other information that can help other team members. The message can be placed at the current location of the device 300, or can be projected into the scene using an elevation database 206 for range determination, or at a distance determined by the user along the chosen view direction. These messages act as virtual sticky notes that team members can add for others to see as they gather new information on the field.

A team member with an overall view of the scene can add notes at different locations with information on things such as accessibility, potential problems ahead or additional people in need of help that may not be visible from the location of the actual team members of the field. These notes then become visible on devices 300 as the relevant locations become viewable.

Other users can see messages on their screens as they pan around their devices, or if a message is targeted to them or their group, will be alerted once they are within the specified distance of the message location. Information posted at a given location can in one embodiment be edited by other team members, enabling refinement of the information by combining the observations of multiple members in real time—for example, once a given victim has been successfully reached, that information will be visible to everybody else on the team in real time. And in a disaster relief effort, information about which places have been searched and what is needed at each location is immediately visible as well at all times.

By combining the information gathered by everybody into a common database, allowing it to be stored at the true physical location where it is most useful and providing a method to access the data in a simple, unobtrusive fashion without requiring an elaborate user interface, the present invention enables collaboration of location deployed teams in ways not possible before. It constitutes a collective memory for the entire team that can enhance its effectiveness without a significant efficiency impact on each individual team member.

Similar applications are possible in the military and homeland defense space, firefighting, law enforcement, utility infrastructure maintenance crews, field surveys, and other situations where fielded team collaboration is required.

EXAMPLE

Airport Approach Procedures

Figure 9:
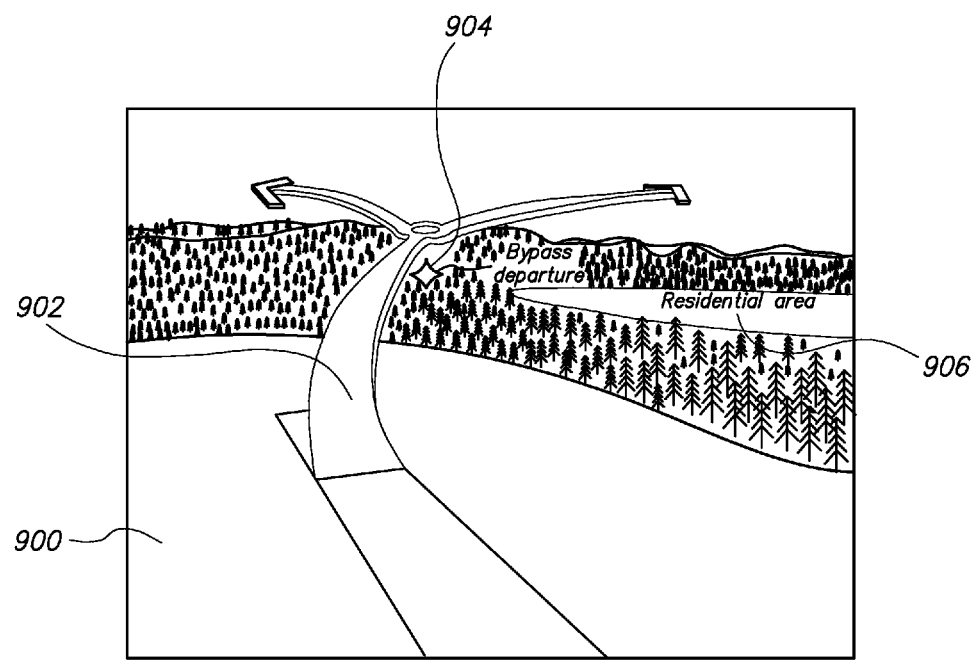
FIG. 9 illustrates airport departure procedures provided as an example of an embodiment of the present invention The figures depict preferred embodiments of the present invention for purposes of illustration only. One skilled in the art will readily recognize from the following discussion that alternative embodiments of the structures and methods illustrated herein may be employed without departing from the principles of the invention described herein.

FIG. 9 illustrates an application of the present invention to airport flight procedures. The illustrations can be overlaid in real-time to assist pilots in flying approaches and departures, complying with noise abatement procedures, and the like. In FIG. 9, which illustrates a departure procedure for runway 28 at an airport, the arrows 902 illustrating the actual departure procedure, the departure waypoint 904 and the "residential area" label 906 are rendered, while the remainder of the image 900 is captured by the camera. Unlike HUD or instrument systems, as the camera pans, the overlays move in real time off-axis.

Although the invention has been described in terms of a preferred embodiment comprising a handheld wireless computing device, its functionality can be implemented in other integrated devices such as video cameras, digital binoculars, digital range finders or GPS positioning devices without substantial differences.

By enabling interaction between system users using a simple panning interface, the claimed invention presents an improved mobile device collaborative environment that simplifies interaction for field operations.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements.

Also, the particular division of functionality between the various system components described herein is merely exemplary, and not mandatory; functions performed by a single system component may instead be performed by multiple components, and functions performed by multiple components may instead performed by a single component. For example, the particular functions of the map data provider, map image provider and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The figures depict preferred embodiments of the present invention for purposes of illustration only. One skilled in the art will readily recognize from the following discussion that alternative embodiments of the structures and methods illustrated herein may be employed without departing from the principles of the invention described herein.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for wireless collaboration, the method comprising:
    sending an update request from a first device to a message server, the update request including first location data associated with a current position of the first device;
    displaying on a screen of the first device an image captured by a camera of the first device;
    receiving from the message server a first message, the first message originated by a second device and including second location data independent of location of the second device and describing a location associated with the first message;
    determining, by the first device, whether a location identified by the second location data is visible on the displayed image captured by the camera of the first device; and
    responsive to the identified location being visible on the displayed image, rendering at least a portion of the first message on the screen of the first device at a point overlaying the position of the identified location.

2. The method of claim 1 wherein the update request includes a second message, the second message addressed to a third device.

3. The method of claim 1 wherein the update request includes a second message, the second message addressed to a plurality of devices.

4. The method of claim 1 wherein rendering the first message on the screen of the first device further comprises displaying an icon at the location of the first message.

5. The method of claim 1 wherein rendering the first message on the screen of the first device further comprises displaying text at the location of the first message.

6. The method of claim 5 wherein the text includes a sender of the first message.

7. The method of claim 5 wherein the text includes a subject of the first message.

8. The method of claim 5 wherein the text includes a time of the first message.

9. The method of claim 5 wherein the text includes a range from a current location of the first device to the location of the first message.

10. The method of claim 1 wherein the location of the first message includes latitude and longitude coordinates.

11. The method of claim 10 wherein the location of the first message includes elevation coordinates.

12. The method of claim 1 wherein the location of the first message includes geolocation tags.

13. The method of claim 12 wherein the geolocation tags are specified using XML.

14. The method of claim 1 wherein the update request further includes a maximum range, and a distance from the current position of the first device to the location associated with the first message is less than the maximum range.

15. A device for wireless collaboration, the device comprising:
- a geolocation device adapted to determine a current position of the device;
- a video camera adapted to capture an image;
- a display screen, adapted to display the image captured by the video camera;
- a wireless network interface adapted to send an update request from the device to a message server, the update request including the current position of the device determined by the geolocation device, and further adapted to receive from the message server a first message, the first message originated by a second device and including second location data associated with the first message;
- a client message management module, adapted to determine whether a location identified by the second location data is visible on the image captured by the video camera; and
- a graphics rendering engine, adapted to render at least a portion of the first message on the display screen at a point overlaying the position of the identified location, responsive to a determination by the client message management module that the location identified by the second location data is visible on the image captured by the video camera.

16. The device of claim 15, wherein the wireless network interface is further adapted to include in the update request a second message, the second message addressed to a third device.

17. The device of claim 15, wherein the wireless network interface is further adapted to include in the update request a second message, the second message addressed to a plurality of devices.

18. The device of claim 15 wherein the rendered portion of the first message includes an icon at the location of the first message.

19. The device of claim 15 wherein the rendered portion of the first message includes test at the location of the first message.

20. The device of claim 19 wherein the text includes a sender of the first message.

21. The device of claim 19 wherein the text includes a subject of the first message.

22. The device of claim 19 wherein the text includes a time of the first message.

23. The device of claim 19 wherein the text includes a range from a current location of the first device to the location of the first message.

24. The device of claim 15 wherein the second location data includes latitude and longitude coordinates.

25. The device of claim 24 wherein the second location data includes elevation coordinates.

26. The device of claim 24 wherein the second location data includes geolocation tags.

27. The device of claim 15 wherein the wireless network interface is further adapted to include in the update request a maximum range, and a distance from the current position of the device to the location identified by the second location data is less than the maximum range.

28. A computer program product for wireless collaboration, the computer program product stored on a non-transitory computer-readable medium and including instructions adapted to cause a processor to carry out the steps of:
- sending an update request from a first device to a message server, the update request including first location data associated with a current position of the first device;
- displaying on a screen of the first device an image captured by a camera of the first device;
- receiving from the message server a first message, the first message originated by a second device and including second location data independent of a location of the second device and describing a location associated with the first message;
- determining, by the first device, whether a location identified by the second location data is visible on the displayed image captured by the camera of the first device; and
- responsive to the identified location being visible on the displayed image, rendering at least a portion of the first message on the screen of the first device at a point overlaying the position of the identified location.

* * * * *